(12) United States Patent
Klein

(10) Patent No.: US 10,979,872 B2
(45) Date of Patent: *Apr. 13, 2021

(54) BLOCKCHAIN SYSTEM AND METHOD FOR CALCULATING LOCATION OF TIME-CRUCIAL SHIPMENTS ACCORDING TO EXPECTATION AND SMART CONTRACTS

(71) Applicant: Elliot Klein, Aventura, FL (US)

(72) Inventor: Elliot Klein, Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,389

(22) Filed: Sep. 29, 2020

(65) Prior Publication Data

US 2021/0014653 A1    Jan. 14, 2021

Related U.S. Application Data

(63) Continuation of application No. 17/010,460, filed on Sep. 2, 2020, now Pat. No. 10,904,722, which is a (Continued)

(51) Int. Cl.
*H04W 4/35* (2018.01)
*H04W 4/70* (2018.01)
(Continued)

(52) U.S. Cl.
CPC .......... *H04W 4/35* (2018.02); *G06Q 10/0833* (2013.01); *H04L 9/0637* (2013.01);
(Continued)

(58) Field of Classification Search
CPC .............. G06F 17/30867; G06Q 30/02; G06Q 30/0269; G06Q 30/0273; G06Q 10/0833;
(Continued)

(56) References Cited

U.S. PATENT DOCUMENTS 8,965,412 B2   2/2015   Alizadeh-Shabdiz et al.
9,020,536 B1   4/2015   Crossno et al.
(Continued)

OTHER PUBLICATIONS

Karkkainen, Mikko; Ala-Risku, Timoand Kary Framling; Publication Info: International Journal of Physical Distribution & Logistics Management 34.7/8: 545-564. Emerald Group Publishing Limited. Feb. 2004.
(Continued)

*Primary Examiner* — Monica C King
(74) *Attorney, Agent, or Firm* — Philip E. Levy; Eckert Seamans Cherin & Mellott, LLC

(57) ABSTRACT

A client-server system and a blockchain method for calculating whether a time-crucial shipment is located according to an expectation comprising a client device adapted for being adhered to or placed within a time-crucial package shipment; and a remote special purpose computer server comprising a transit plan schedule database based on pickup time and location stored in memory, the remote special purpose computer server being programmed to calculate a location of the client device based on data accessed from a Wi-Fi access point location database, the transmitted identification data, and the transmitted signal strength data, and compare the calculated location to an expected location based on common carrier schedule transit plan pickup time and delivery location received from third party database sources.

30 Claims, 7 Drawing Sheets

Related U.S. Application Data continuation of application No. 16/985,470, filed on Aug. 5, 2020, now Pat. No. 10,856,116, which is a continuation of application No. 16/640,793, filed as application No. PCT/US2019/054598 on Oct. 4, 2019, which is a continuation of application No. 16/162,678, filed on Oct. 17, 2018, now Pat. No. 10,217,078.

(51) Int. Cl.
*H04W 4/029* (2018.01)
*H04W 4/80* (2018.01)
*G06Q 10/08* (2012.01)
*H04L 9/06* (2006.01)
*H04W 4/021* (2018.01)

(52) U.S. Cl.
CPC ............ *H04W 4/021* (2013.01); *H04W 4/029* (2018.02); *H04W 4/70* (2018.02); *H04W 4/80* (2018.02); *H04L 2209/38* (2013.01); *H04L 2209/80* (2013.01)

(58) Field of Classification Search
CPC ............... G06Q 10/1093; G06Q 10/00; G06Q 10/0635; G06Q 10/0831; G06Q 40/08; H04B 17/318; H04B 10/116; H04B 10/25752
See application file for complete search history.

(56) References Cited

U.S. PATENT DOCUMENTS

| | | |
|---|---|---|
| 9,107,046 B2 | 8/2015 | Putman |
| 9,267,812 B1 | 2/2016 | Sachdev et al. |
| 9,279,683 B2 | 3/2016 | Turon et al. |
| 9,349,270 B1 | 5/2016 | Crossno |
| 9,432,500 B2 | 8/2016 | Putman |
| 9,439,164 B2 | 9/2016 | Stewart et al. |
| 9,460,412 B2 | 10/2016 | Gates et al. |
| 9,547,079 B2 | 1/2017 | Hyatt et al. |
| 9,609,484 B1 | 3/2017 | Rodoper |
| 10,037,508 B1 * | 7/2018 | Rusnak ................ H04W 4/023 |
| 2004/0239523 A1 | 12/2004 | Paoli et al. |
| 2011/0054979 A1 | 3/2011 | Cova et al. |
| 2013/0331124 A1 | 12/2013 | Rieger, III |
| 2015/0161697 A1 | 6/2015 | Jones et al. |
| 2015/0271046 A1 | 9/2015 | Clubb et al. |
| 2016/0042317 A1 | 2/2016 | Goodman et al. |
| 2016/0205500 A1 | 7/2016 | Lee et al. |
| 2016/0302039 A1 | 10/2016 | Culpepper et al. |
| 2016/0381211 A1 | 12/2016 | Putman |

OTHER PUBLICATIONS

International Search Report and Written Opinion of the International Searching Authority for PCT/US2019/054598, dated Oct. 31, 2019.

\* cited by examiner

BLOCKCHAIN SYSTEM AND METHOD FOR CALCULATING LOCATION OF TIME-CRUCIAL SHIPMENTS ACCORDING TO EXPECTATION AND SMART CONTRACTS

CROSS-REFERENCE TO RELATED APPLICATIONS

This application is a Continuation application, which claims priority from U.S. patent application Ser. No. 17/010,460, filed on Sep. 2, 2020, entitled "BLOCKCHAIN SYSTEM AND METHOD FOR CALCULATING LOCATION OF TIME-CRUCIAL SHIPMENTS ACCORDING TO EXPECTATION AND SMART CONTRACTS," which claims priority from U.S. patent application Ser. No. 16/985,470, filed on Aug. 5, 2020, entitled "BLOCKCHAIN SYSTEM AND METHOD FOR CALCULATING LOCATION OF TIME-CRUCIAL SHIPMENTS ACCORDING TO EXPECTATION AND SMART CONTRACTS," which claims priority from U.S. patent application Ser. No. 16/640,793, filed on Feb. 21, 2020, entitled "BLOCKCHAIN SYSTEM AND METHOD FOR CALCULATING LOCATION OF TIME-CRUCIAL SHIPMENTS ACCORDING TO EXPECTATION AND SMART CONTRACTS," which is a U.S. National Stage under 371 of PCT International Application No. PCT/US2019/054598, filed on Oct. 4, 2019, entitled "BLOCKCHAIN SYSTEM AND METHOD FOR CALCULATING LOCATION OF TIME-CRUCIAL SHIPMENTS ACCORDING TO EXPECTATION AND SMART CONTRACTS," which claims priority from U.S. patent application Ser. No. 16/162,678, filed on Oct. 17, 2018, now U.S. Pat. No. 10,217,078, which issued on Feb. 26, 2019, entitled "BLOCKCHAIN SYSTEM AND METHOD FOR CALCULATING LOCATION OF TIME-CRUCIAL SHIPMENTS ACCORDING TO EXPECTATION AND SMART CONTRACTS," the contents of which are incorporated herein by reference.

BACKGROUND OF THE INVENTION

This invention relates to the field of logistics systems and methods. More particularly the invention relates to systems and methods of tracking location of a package which is en route from a shipping location to a destination location, and to systems and methods to ensure that an extremely time-critical delivery is proceeding according to schedule and to alert the shipper or recipient or a designated third party if there is a problem with shipment such as a flight or truck delay or mishandled package or misdirected delivery.

Sometimes next day shipping service just isn't fast enough when a customer needs a replacement part for an assembly line that's down, or a part is needed for an aircraft that is idle because of part missing, or a human organ needs to be shipped for transplant across the continent, or tissue samples, bone marrow or eye for transplant needs next flight out speed. In such cases the shipper or recipient will engage a private logistics shipment service, commercial airline carrier, charter flight, or Next Flight Out (NFO) delivery service to transport the package since time is so critical. In other cases the parties may elect to use one or more common carriers to transport the package from pick up to delivery such as planes, trains, and/or trucks that operate according to a schedule.

Some existing services such as Amazon, Wal-Mart, Federal Express, DHL, scheduled air carriers, and the like offer same day delivery to certain locations. However, even though such services are generally reliable and offer tracking services, occasionally mistakes happen during shipments, for example a package may miss a flight or a truck may be delayed due to weather, accident, or traffic conditions and so even if the chances of such a mistake are very small, for extremely time-sensitive shipments such as the above-mentioned situations there is a need for extremely accurate tracking systems and methods which are superior to state of the art methods that can include blockchain and smart contracts.

SUMMARY OF THE INVENTION

This need, and others which will become apparent from the following disclosure and drawings, is addressed by the present invention which comprises in one aspect a system comprising a client device which is adapted for being adhered to or placed within a time-crucial package, the device configured to receive a Wi-Fi signal from a Wi-Fi access point and to communicate data to one or more servers via GSM wireless transmission protocol; and one or more servers configured to receive data via GSM from the device and to receive schedule data from a common carrier that includes a scheduled airline or truck tracking service; the one or more servers programmed to determine location of the device at a given time by comparing the data received from the device to a database of Wi-Fi access point locations, the one or more servers programmed to compare the determined location to a scheduled location according to the data received from the common carrier reporting or tracking service.

In another aspect the invention comprises a method of determining the location of a package at a given time comprising comparing data received via GSM protocol from the client device which obtained the identification data from a set of Wi-Fi access points to a known location of each Wi-Fi access point to a scheduled location obtained from a common carrier tracking service, thereby calculating whether the device is located according to the scheduled location. In another aspect the method comprises signaling an alarm if the client device is not located according to the scheduled location and reporting the last known location according to data received via GSM protocol from the device. Another aspect of the method includes a step of reporting received signal strength from one or more known Wi-Fi access points and time of reception of the signal. In some embodiments a GSM communication gateway allows for both USSD or SMS, two types of messages, to be sent.

The system can make battery saving decisions based on a variety of factors in the supply chain. For instance, a system that has additional information on location availability or route delays based on flight or truck database schedules can dynamically adjust the location update frequency of the device to save power. Additionally, the system can increase frequency or change modes to ensure supply chain compliance or gain additional information about the location state of the shipment and its environment.

In another aspect the invention comprises a blockchain method for calculating whether a time-crucial shipment is located according to an expectation comprising: providing a system according to claim 1; receiving, by the Wi-Fi receiver of the client device identification data of one or more nearby Wi-Fi access points, measuring, by the Wi-Fi receiver, signal strength data of the one or more nearby Wi-Fi access points, transmitting, by the microcontroller, via the GSM radio module to a remote special purpose computer server the received identification data and the considered signal strength data when movement is detected by the accelerometer; calculating, by the remote special purpose computer server, a location of the client device based on data accessed from a Wi-Fi access point location database with time stamp, the transmitted identification data, and the received signal strength data; and comparing, by the remote special purpose computer, the calculated location to an expected location based on blockchain database system data with real-time ownership and location journey of package shipments shared and managed in an immutable and distributed ledger.

Some embodiments comprise reporting device data based on calculated or transmitted location, temperature, movement, or chain of custody data so shipment data can be transferred to or traded according to smart contracts in the blockchain.

With emergence of the Next Flight Out (NFO) air transportation market for critical shipments, when time and mission critical logistic requirements needs shipments delivered within hours, not days, planning the best flight path and being able to adopt and react to exception reporting with confirmations of the location and related temperature, chain of custody and reporting of each shipment at any point and time worldwide is critical to ensure on-time delivery and manage smart contracts in the blockchain.

Once the package has been tendered to an airline, the airline or other common carrier is not obligated to provide any updates as to whether the package made it on the desired flight. A common practice is barcode scanning each piece as it is loaded onto the airplane or truck. That allows the shipper to login to a custom airline cargo portal to see if it has made the flight, or similarly, to a truck vehicle delivering the package.

There are two main problems with both of these current systems. The first and most problematic are the false positives. It is very common for an airline or other common carrier to scan a piece indicating that it was loaded onto the plane or truck and then have that piece be intentionally refused, left on the loading dock or unloaded. This means that when the shipper logs in, they see that the shipment was verified onboard and they can expect to recover it one hour after the plane lands when it is released from cargo. In the case of a five-hour cross-country flight, there is no indication of error or delay for six hours. Once it is established that the piece is not at the destination airport, a game of finger pointing ensues. The destination airport calls the departure airport saying the package never arrived. The departure airport insists that it is at the destination airport because it was scanned on board the plane. The destination airport searches again and the calls the departure airport insisting that it never arrived. Finally, the departure airport searches the dock and finds the piece. At this point, hours have passed and the shipment has still not left the origin city and needs to be placed on a new flight. Similar situations apply to vehicle deliveries when a package is placed on truck after arriving by plane.

The package being left at the departure airport without notice is a much too common case. A less common, but even more costly case is when a shipment is loaded on the wrong aircraft. The shelving and organization system airlines use is very manual with little verification. A package meant for Kansas may end up on a flight to Korea simply because they are proximal to each other in the cargo area. A mistake of this nature can delay the shipment by days. In the case of a critical shipment like a human organ or part for a downed aircraft or machine, the associated costs can be significant.

The second problem with relying on airline notifications of on-boarding is that they are separate closed systems with very little control and transparency for the people that are relying on those systems to be correct. Each of them functions differently with a varying degree of success. A system that is designed to track critical organ deliveries cannot interface with every airline or common carrier over email.

A definitive measure of both take-off and landing is required in order to have a closed supply chain that critical shipments can use to mitigate delays in real-time. Those messages need to interface with complex shipment tracking systems to notify operators as soon as an error occurs in order to minimize supply chain down time.

The location monitoring apparatus attached or inside package finds Wi-Fi networks in-range and sends the router's BSSID/MAC address, report time, and signal strength, over wireless communication methods. The reported device data is communicated to computer servers and by API and computer database with router-specific MAC addresses to be matched though third party mapping and location engines or other Wi-Fi Point of Interest databases (i.e., specific Wi-Fi BSSID/MAC address of aircraft or near runways) with collected Wi-Fi location coordinate matching records to determine a package or other shipment's location(s) en route. Accurate location capabilities, combined with real-time Wi-Fi network location intelligence data offer increased efficiency in resource and supply chain management, with lower cost and significant less device power consumption than conventional higher power GPS tracking solutions. Accuracy is also significantly improved since one or more Wi-Fi data sources can be specific to a floor, room, warehouse or even a specific aircraft's wireless access point(s) where traditional GPS systems are limited to only reporting latitude and longitude coordinates.

The system and method provide real-time location with Wi-Fi signal intelligence to determine the package's location en route.

The present invention improves en route package exception reporting and delivery processing for time-critical shipments with a system accessible to the global supply chain with a low cost data reporting device adding real-time, accurate location granularity for both indoor and outdoor location determinations, combined into a market-ready internet-of things (IoT) system with integration into blockchain system and methods, and logistic carriers and enterprise management API's, flight databases and computer servers to exchange and process en route location reporting data between the electronic device on or within package, and third party computer server(s) processing the data received over wireless GSM transmission networks. This is crucial and beneficial for package shipments en route or when package is in enclosed within en route (i.e., a truck dispatch station) or pre-flight indoor environments (i.e., an aircraft hangar), and improves upon prior art that rely on GPS location where GPS signals are blocked. Examples of blocked GPS signals include in-aircraft cargo holding areas and logistics service holding warehouses and indoor package transfer areas that lack access to GPS satellites, representing one of several improvements over prior art.

DETAILED DESCRIPTION OF THE INVENTION

Figure 1:
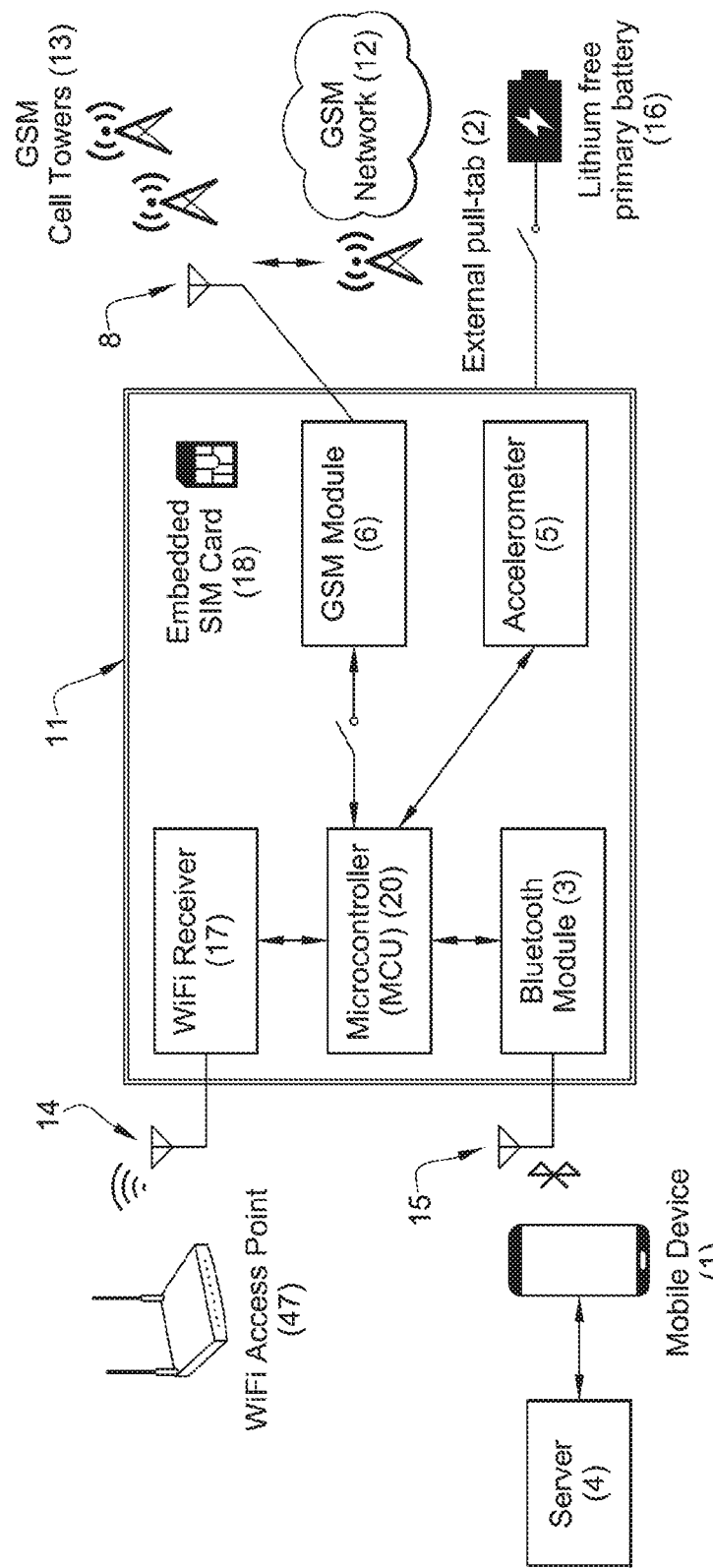
FIG. 1 is a schematic of an embodiment of a device according to the invention.

According to a first embodiment of the invention, referring to FIG. 1, the client device 11 includes a Wi-Fi receiver 17, a microcontroller unit ("MCU") 20, a Bluetooth module 3, a GSM module 6, an accelerometer 5, a Wi-Fi antenna 14, a GSM antenna 8, a lithium-free or rechargeable battery 16 which can be disconnected from the remainder of the device 11 by optional pull tab 2. The MCU 20 sends instructions to and receives data from an accelerometer 5. GSM module 6, Bluetooth module 3, and Wi-Fi receiver 17. The device also includes an embedded SIM card 18 whenever necessary for GSM transmission to cell tower or cell carrier networks. The client device 11 includes a WiFi antenna 14 which receives signals broadcast by nearby Wi-Fi access points 47 for the Wi-Fi receiver 17, and a GSM antenna 8 which communicates with GSM cell towers 13 within range of the client device 11. GSM signals from a GSM network 12 are also received by GSM antenna 8 and sent to GSM module 6. Client device 11 can include an optional lithium free primary battery 16 so that client device 11 is compliant with US FAA regulations and for safety reasons in all countries. The client device 11 also can include an embedded SIM card 18 which identifies the device for the GSM or related carrier network 12. The client device 11 can communicate via Bluetooth protocol using its Bluetooth module 3 and Bluetooth antenna 15, for example to a mobile device 1 which receives data from server 4. The client device 11 does not store Wi-Fi information but rather only detects Wi-Fi signals and signal strength when it needs to transmit a location which is calculated by the server 4 by looking up the Wi-Fi location of the identified Wi-Fi node in a database. Every location transmitted by the device is it's actual location, not a previous one.

Figure 2:
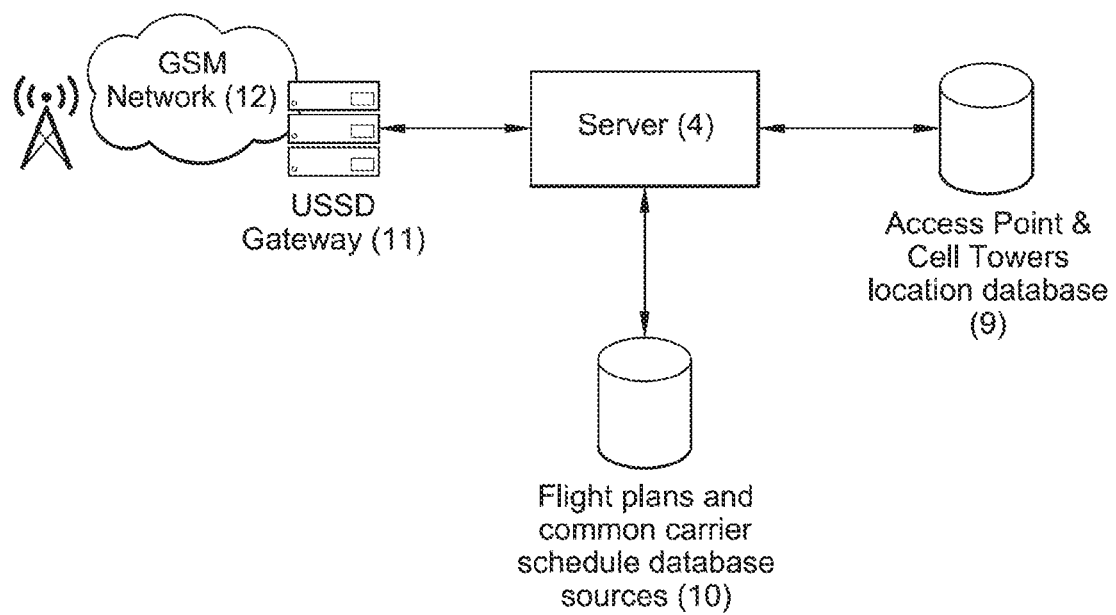
FIG. 2 is a schematic of a special purpose computer server embodiment.

An embodiment of the special purpose computer server 4 is shown in schematic form in FIG. 2 wherein the server 4 includes in memory an access point and cell tower database 9, a flight plans database by example (or alternatively another common carrier database such as a truck shipping database) 10, and a processor which is programmed to carry out the functions of the server 4. The special purpose computer can optionally communicate with a USSD gateway 11 in an alternative embodiment which can communicate with the device 11 over SS7 signaling or otherwise without USSD over GSM network 12.

In overall operation, the device 11 is placed in or on a package prior to shipment of the package via truck, train, and/or scheduled aircraft. Along the way the device 11 encounters Wi-Fi access points of varying signal strength and sends the MAC address and SSID of the encountered Wi-Fi access points of the respective encounters to one or more servers 4 which function as a special purpose computer. The servers 4 use a calculated flight and/or transit plan based on pickup time and location, flight, truck, and train schedules received from third party sources, and destination location and required minimum delivery time to plan a schedule route. The client device 11 is programmed to turn on when power is turned on, for example when the battery 16 is connected by pulling out a power activation pull tab 2. The client device 11 is also programmed to process accelerometer 5 data that includes movement of the package and can also optionally calculate when the client device 11 is vibrating in a pattern which implies the client device 11 is aboard an aircraft with engines running, in which case the client device 11 can automatically turn off its GSM module 6 to prevent transmission of data while the aircraft is flying and turns on its GSM module 6 when the absence of such a vibration pattern implies the client device 11 is no longer on an aircraft whose engines are running.

When the GSM module 6 is on, the client device 11 periodically broadcasts via GSM antenna 8 the Wi-Fi access point 47 data in range of client device 11 which is received at GSM cell towers 13 and which is received in turn by the servers 4 via GSM network 12. The servers 4 compare expected locations to one or more Wi-Fi access point 47 encounters received from the device to determine if the device is located where it is expected. If the device location does not match an expected location at an expected encounter time a notification is issued, for example an alarm notification or an automated phone call to a designated phone number, an alert to third party sever, an e-mail, an SMS message, or other user machine interface.

The client device communicates data by a GSM communication gateway from its GSM transmission module 6 that allows a range of short data transmission methods including but not limited to USSD or SMS short data messaging, to be sent to a remote special purpose computer 4. USSD is one of several methods since it is a short message data format (i.e., typically 160 bytes or 182 alphanumeric characters) that has the advantage of using less transmission power thus preserving device battery power to last across international transport schedules or during extended shipping route delay.

FIG. 1 illustrates a system including a courier driver mobile communication device such as a cell phone 1 or other mobile computing device which receives instruction from a special purpose computer 4 which functions as one or more servers, referred to herein as "AirTrace" by example, on an app running on the driver cell phone 1 for a new package to be picked up at a specific location. The driver is instructed to attach or install a client device 11, referred to herein as "AirTrace tracker," in the package or onto package by self-adhesive attachment means when it is picked up.

In this first embodiment the client device 11 comprises a battery (lithium or non-lithium) 16, memory 6, an accelerometer 5, a GSM module 6, a Wi-Fi receiver 17, a microcontroller ("MCU") 20, a Bluetooth module 3, Wi-Fi antenna 14, GSM antenna 8, and an optional pull tab 2 which prevents drainage of the battery 16 until the driver or user pulls it to activate the client device 11. The driver needs to be sure that the client device 11 selected to be included in the time-critical package is fully charged. The plastic pull tab 2 is used as a switch to connect the batteries with the tracker circuit. The pull tab cannot 2 be re-installed so the driver can confirm it is the first time the client device 11 has been activated and fully powered when the tab 2 is pulled.

Non-lithium AAAA alkaline primary batteries 16 can be used instead of rechargeable lithium-ion batteries. Using a non-lithium battery makes the device safer for flight safety compliance and transport usage, and has a lower self-discharge current that allow for long storage periods, without losing power. Once the device is ON, a LED indicator will allow the driver or user to determine if the device is ready to be used. A green light indicates that battery level is correct, and connectivity over the GSM network could be established. The driver phone 1 connects with the client device 11 via the Bluetooth modem and the device reports 17 reports its unique electronic identification number received or associated from SIM card 18 over the Bluetooth Module 3 signal so every future location reading can be correctly associated to the device package tracking information. The driver or user's mobile communication device such as a cell phone App reports to AirTrace Server 4 the Tracker Id to be used.

From that moment forward, all communication from the client device 11 to AirTrace Services, i.e., the server, 4 is done exclusively over the GSM network 12, through the use of USSD messages. GSM network wireless transmission technology is distributed in most countries around the world by wireless telecommunication carriers, allowing for package tracking in almost every country.

Transmission over the GSM network demands more energy than any other single operation performed by the device. Determining the right moment to transmit is thus very important for power efficiency. The client device 11 includes an accelerometer 5 that allows client device 11 to determine movement, even minor vibration. The accelerometer 5 can be used for two objectives; to prevent the client device 11 from transmitting when it is moving by turning off the GSM module 6, thereby preventing any kind of transmission to be done before a plane takes off and until it has landed and the package is not moving any more. The accelerometer 5 is sensitive enough to detect vibrations caused by the plane engines, so no transmission is also intended during flight and when no plane engine vibrations are detected GSM module 6 is turned back on and the client device 11 reports its location. The accelerometer can also be used for a second objective, that is to communicate with the microcontroller and trigger the GSM radio module to report location of the package after movement pattern of the accelerometer have been detected as a power-saving benefit compared to having device transmit location and consume power when it is not moving or has not been moved for a selected period of time.

Depending on the shipping en route plan, the AirTrace server 4 may also configure other operation modes during the shipment. For example, if the shipping only requires truck transportation, a message can be sent to configure the device to report its location on a time sequence, regardless of accelerometer readings. The same example applies for a package that did require flight transportation but flight has already occurred and the rest of the shipping is carried out by truck. Another example would be a package delayed in customs for two days, then AirTrace server may instruct the device to stop all activity for a period of time, saving energy for later.

Once the MCU 20 determines a location needs to be reported, it requests a Wi-Fi receiver to scan for Wi-Fi access points that may be near to the device. The Wi-Fi receiver eventually informs a list of Wi-Fi access points, including each Wi-Fi access point Mac Address or SSID, and signal strength RSSI. The MCU 20 will then order the list of Wi-Fi access points by signal strength, and then for supplemental or better location verification ask the GSM Module 6 to scan for one or more GSM Cell tower 13 ID data points detected to be in range of the device. The list of Wi-Fi access points 47 and supplemental GSM Cell tower 13 data serve as location verification reference points that are known by the AirTrace Service 4 through the Wi-Fi access point 47 and cell tower 13 ID location database 9. The MCU 20 will then create a set of USSD messages, each transmitting the collected data in real time and containing a Wi-Fi access point 47 collection data or supplemental cell tower ID information, to be transmitted to server(s) 4 (referred to herein as "AirTrace Service") over the GSM network.

AirTrace servers receive reference points information, and based on the geographical records kept in one or more Wi-Fi access point 47 and Cell Tower ID location databases, will compare to known Wi-Fi access point 47 locations or attempt to triangulate the device location from multiple location data sources, and record it in the server as part of the corresponding shipping confirmations or exception tracking.

Figure 3:
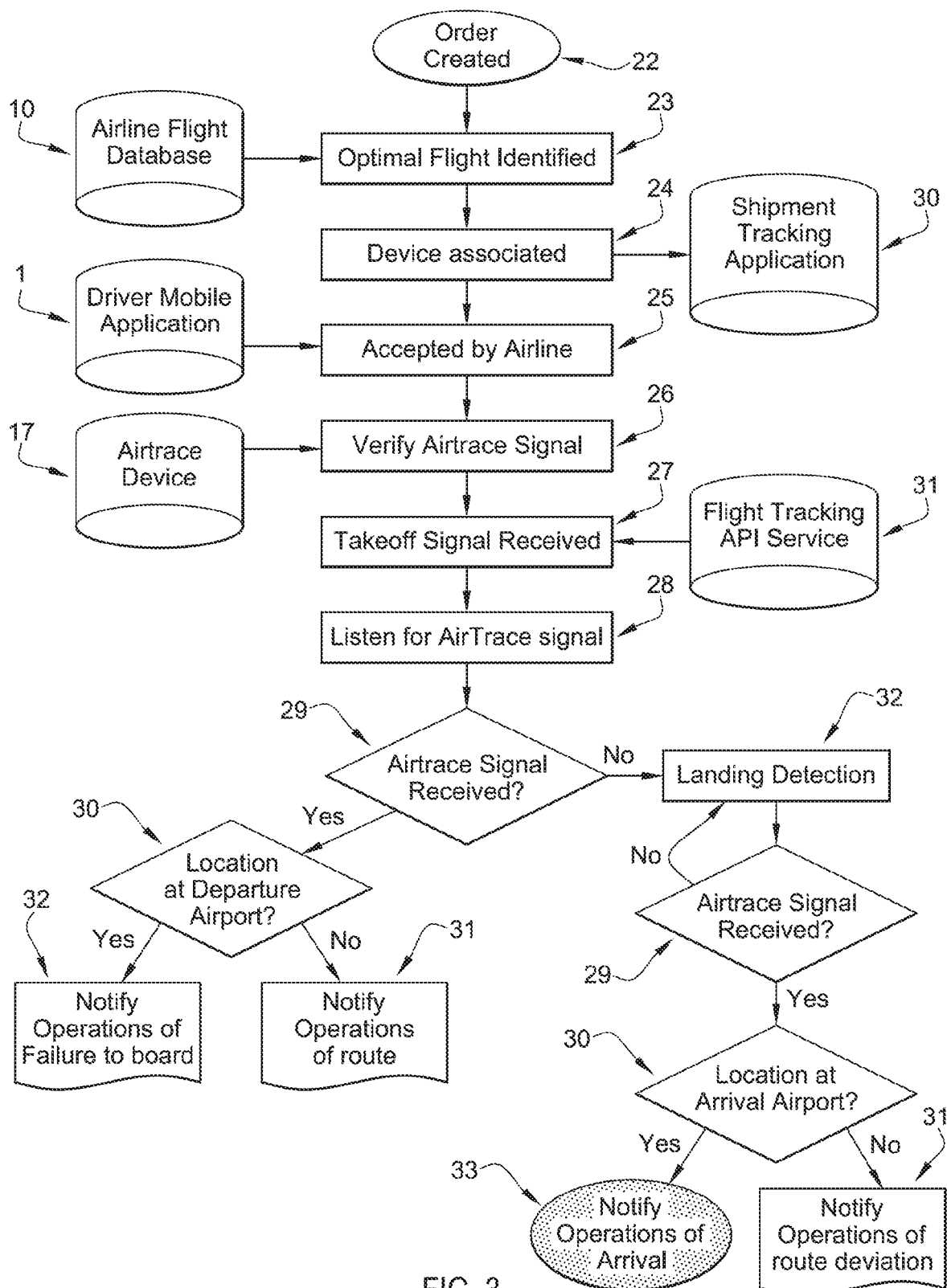
FIG. 3 is a flow chart of a method of the invention.

FIG. 3 is a flow chart of an exemplary method wherein an order is created 22, an optimal flight is identified 23 using, by example, an airline flight database 10. The client device 11 is associated 24 and reported to a shipment tracking application for a common carrier shipping system that can include truck shipment 30. The driver mobile phone 1 application reports acceptance by the package airline, or other common carrier truck shipper, and/or air carrier 25. The client device 11 reports and the device signal is verified 26. As an option, when aircraft engine vibration is detected, a takeoff signal is received 27 and a flight tracking API service 31 is used to calculate or report an expected package location at various times, for example at a connecting airport, destination airport, and/or truck depot. The system listens 28 for an AirTrace signal and if received 29 the server calculates whether the device is located 30 at the departure airport. If so, operations is notified 31 either of a failure to board 32 or a route deviation 31. If landing is detected 32, the system determines 29 whether client device 11 signal has been received. If so, the system calculates whether the device is located at expected arrival airport 30. If located at expected arrival airport, operations is notified 33 of client device 11 arrival by server message, otherwise operations is notified 31 of a likely route deviation or shipment location exception.

The device platform in FIG. 3 includes support for a Bluetooth network stack based on the Bluetooth chip inside the location device, which allows the package-positioning device to wirelessly exchange data with other Bluetooth devices (e.g., a delivery driver's mobile phone other mobile computing device).

Bluetooth is managed by the Bluetooth Special Interest Group (SIG), and operates at frequencies between 2402 and 2480 MHz, or 2400 and 2483.5 MHz including guard bands 2 MHz wide at the bottom end and 3.5 MHz wide at the top. The system's application framework provides access to the Bluetooth functionality through the Bluetooth APIs to pair between two devices. These APIs let applications wirelessly connect to other Bluetooth devices, enabling point-to-point and multipoint wireless features. Examples include the device on or inside a package to communicate to a mobile phone or other Bluetooth receiver in range of the positioning device and share it's ID and pair location of a driver's smart phone while en route to airport or other POI area. The benefit of Bluetooth includes not needing to activate the device's Wi-Fi connection to prolong device battery life. Bluetooth function can either be used to complement or in place of Wi-Fi access points for transmitting a unique ID to identify a package in-transit and not yet at an airport or POI Similar to Wi-Fi positioning, the Bluetooth chip inside device can estimate distance based on received signal strength from Bluetooth Low Energy signals emitted by the Bluetooth sensor and chipset inside package-positioning device that constantly broadcast their presence in range of a second Bluetooth receiver device (e.g., mobile phone or mobile computing device of shipment driver).

In other embodiments, Bluetooth chip inside the package communication device can also be used to associate a user or shipment with an attached tracking device, receiving an indication that the tracking device is lost or misplaced, setting a flag indicating that the tracking device is missing, receiving a location within a proximity of the tracking device from one of a plurality of mobile devices associated with a community of users, and providing the location to the user to help track the location reported based on the crowd sourced location positioning reported by Bluetooth chip and associated firmware within the Bluetooth chip.

The system and method of the invention allows for Bluetooth module and connection protocols, to associate wireless device, and its unique device ID to communicate to third party computer server, and to confirm pickup over mobile app or API that en route delivery by driver has started, and/or to receive instruction to connect the device pre-applied or to be placed by driver by accessing a mobile app running on their mobile device (phone or mobile communication tablet device) for a new package to be first accepted for delivery, requiring driver or other receiving package delivery service to add and attach or receive the package with the novel tracking device already pre-placed by shipper onto a package or part, or placed inside the package. As the driver needs to ship accept and begin package delivery steps on a schedule right away, the driver selects in mobile app the tracker device option to be associated that is fully charged, and activates the power-on pull tab to verify connection over GSM and begin the package's en route journey based on a planned delivery schedule.

From that moment forward, all communication from the client device 11 to server 4 is done exclusively over the GSM network 12. The GSM network 12 is distributed all over the world, allowing for package tracking in almost every country. Data messages from device is managed by various Gateway 11 options managed by the telecommunication company that provides the SIM Card 18 or other network carrier connection transmission protocol installed on each client device 11.

Transmission over the GSM network 12 demands more energy than any other operation performed by the device. Determining the right moment to transmit is then very important for power efficiency. The tracking device 11 includes an accelerometer module 5 with firmware built-on that allows MCU 20 to detect and process data from the activity, even minor vibration or other movements. The accelerometer 5 is then used to perform one or more of these steps:

1 Engine vibration patterns characteristic and determined by the device accelerometer sensor inside device and associated processing firmware and software to report aircraft engine flight engine patterns, and/or;
2 Prevent the device to transmit when it's moving or alternatively, if it is not moving. After movement has been detected over a period of time, the whole GSM Module 6 can be turned on or off, depending on WiFi signal reporting changes, and or;
3 Force the client device 11 to report its location after movement starts and ceases.

Figure 4:
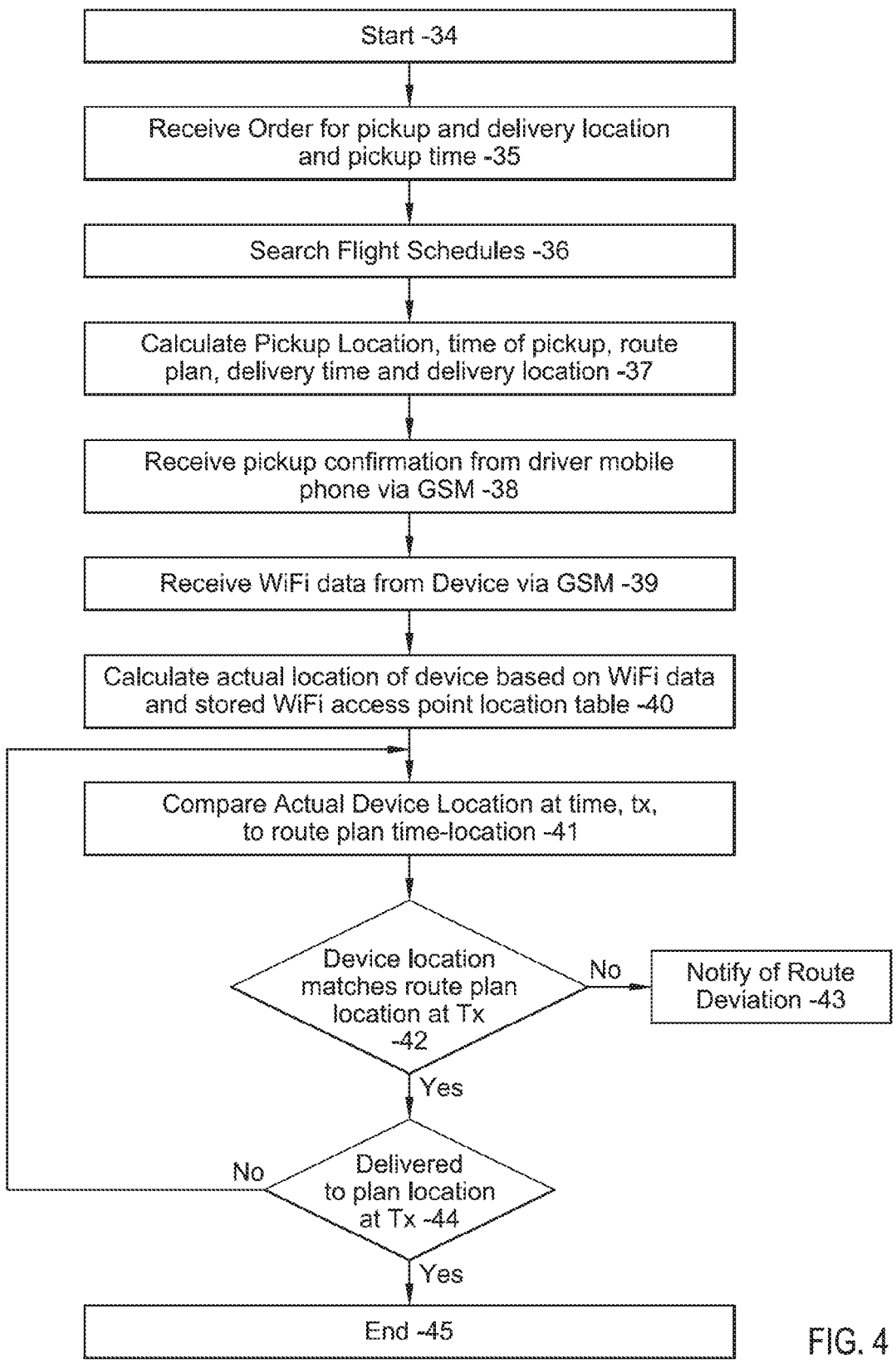
FIG. 4 is an embodiment of a method carried out by the special purpose computer server of the invention.

FIG. 4 is a flow chart of the server operation. The process starts 34 when an order is received 35. The server searches 36 common carrier schedule databases such as the example of flight schedules, calculates 37 pickup location, time of pickup, route plan, delivery time, and delivery location. The server receives 38 pickup confirmation from a driver's mobile phone or device, receives 39 Wi-Fi data from the device via GSM, calculates 40 actual location of the client device 11 based on Wi-Fi data and a stored Wi-Fi access point location table, compares 41 the actual location at time, $T_X$, to route plan time-locations. In shipments involving drivers with mobile phones or computing device 1, the system may also consider the driver's GPS location of that mobile phone 1 or communication device and calculate whether a driver has erroneously indicated that a package has been picked. The system calculates 42 whether the client device 11 location matches the route plan time location. If not, a notice of route deviation is sent 43; if so, the server calculates 44 whether the client device 11 has been delivered to a planned or expected location. The process ends 45 when the device is located to the planned location.

Figure 5:
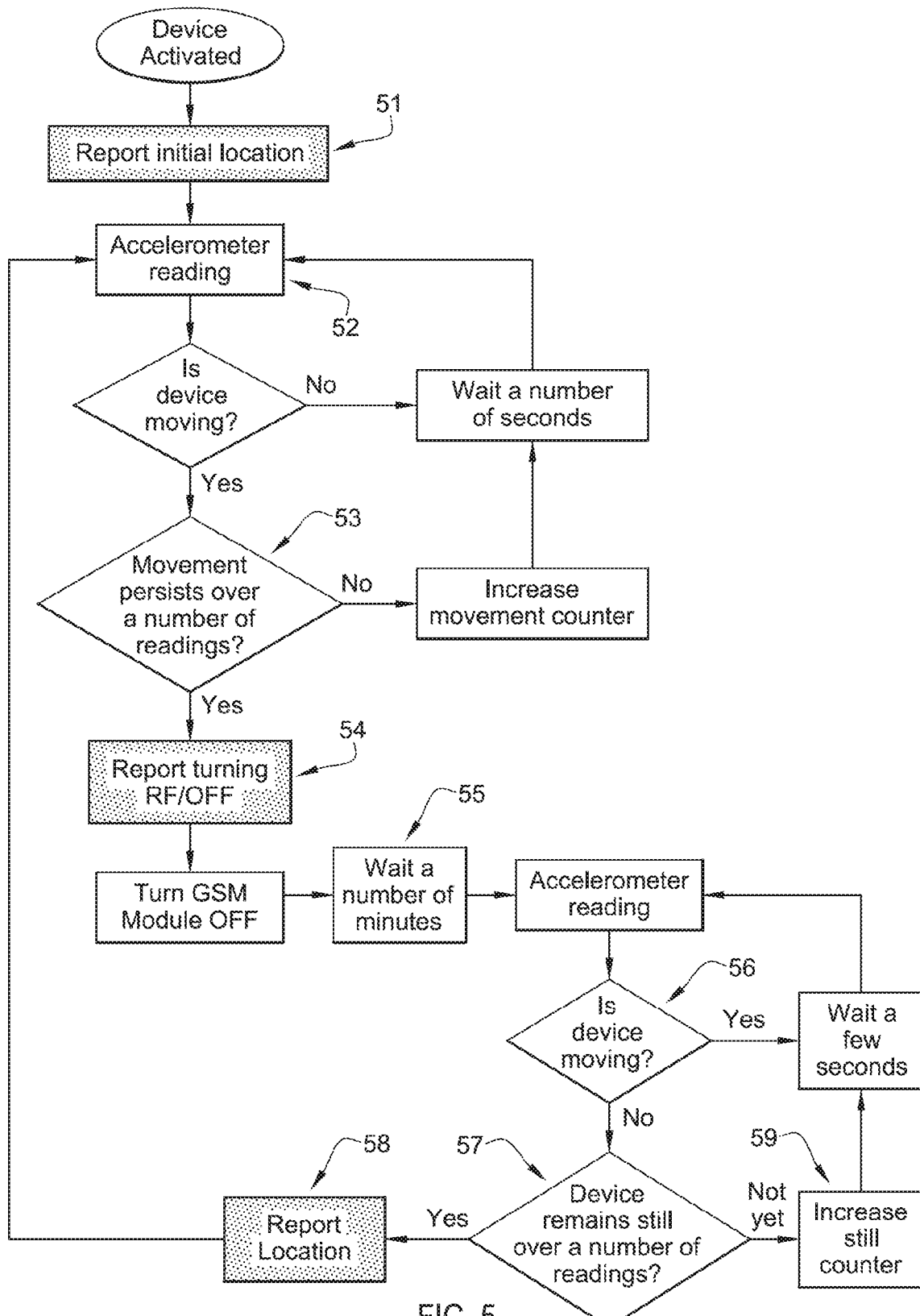
FIG. 5 is a flow chart of the function of the accelerometer.

FIG. 5 is a flow chart of an aspect of an embodiment of a method regarding the function of the accelerometer wherein after the device is activated it reports its initial location 51 and obtains an accelerometer reading 52 to determine if the device is moving. If it is moving and the movement persists over a number of readings 53, the RF can be programmed by the MCU and/or client server to be turned on or off and a report is sent 54, the GSM module is toggled to OFF or ON, an accelerometer reading is taken after waiting a pre-determined number of minutes 55, and if the device is moving according to the accelerometer reading 56, another accelerometer reading is taken after a predetermined number of minutes until the device remains still 57 over a preset number of accelerometer readings and the location is reported 58. If the device does not remain still for the preset number of accelerometer readings, the still counter is increased 59 and another accelerometer reading may be taken after a few seconds or other interval.

Figure 6:
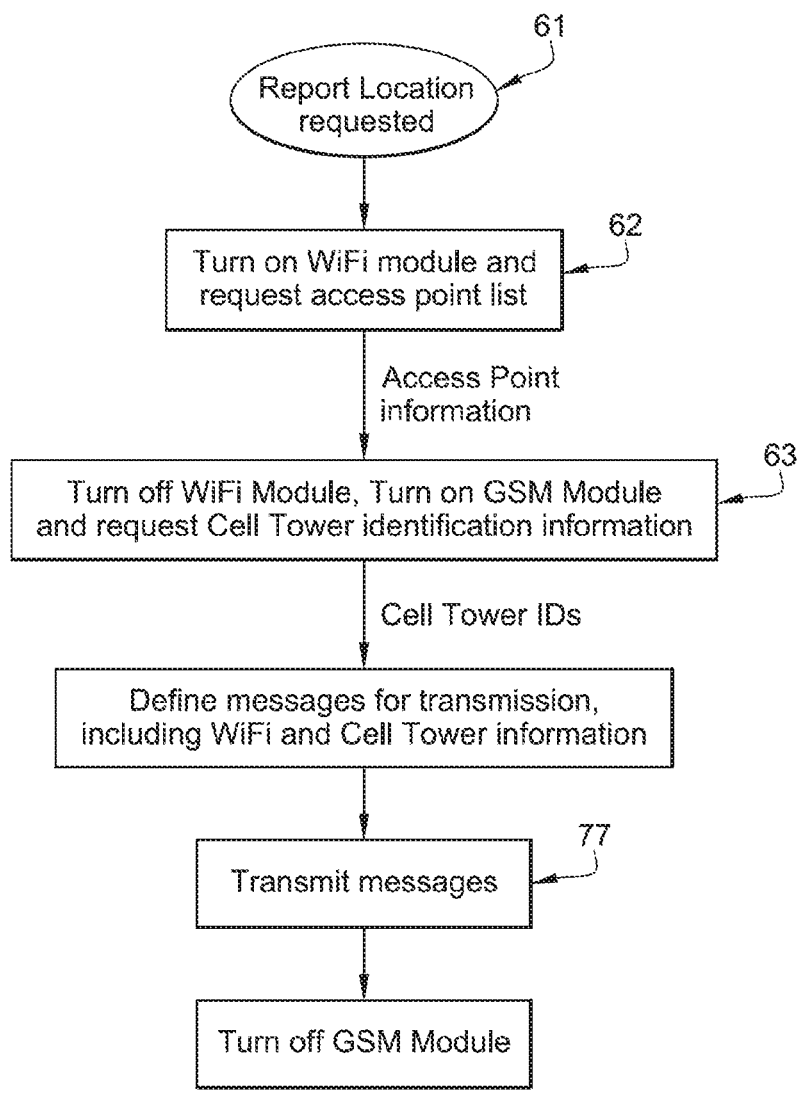
FIG. 6 is a flow chart of an aspect of the method regarding toggling the GSM module, Wi-Fi module, and supplemental use of cell tower IDs.

FIG. 6 is a flow chart of an embodiment of an aspect of the method regarding toggling the GSM module, Wi-Fi module, and use of supplemental cell tower IDs wherein the server requests a location report from the device 61 which turns on the Wi-Fi module and requests a Wi-Fi access point list 62. The Wi-Fi module is turned of after sending the Wi-Fi access point information to the MCU and the GSM module is toggled to ON and a request for cell tower identification information is done 63. After any cell tower IDs are received, the device module defines messages for transmission including Wi-Fi and cell tower information and transmits that information over USSD channel 77 before toggling the GSM module off. The report location requested 61 can include the system's microcontroller further programmed to transmit via GSM radio module only after accelerometer described in FIG. 5 first detects movement and second, the device's microcontroller performs a comparison step to the last set of nearby Wi-Fi receiver access point(s), detected and stored by microcontroller from the Wi-Fi receiver, and determined a change from last stored nearby Wi-Fi access point(s).

The flow chart of FIG. 6 can access internet databases, such as the FAA flight logs or third party carrier transportation databases accessible such as FlightAware™ or OAG Flightview™ flight plans database, or truck databases such as US Postal Service, DHL, Amazon or United Parcel Service to further augment the Wi-Fi traces and reporting time(s) with other real-time flight take-off and landing reporting and/or truck delivery tracking status sources such as geographical information and time constraints (i.e., late flight departure or other FAA database confirmation data that an aircraft has taken off or package has not yet been picked up by a truck).

Figure 7:
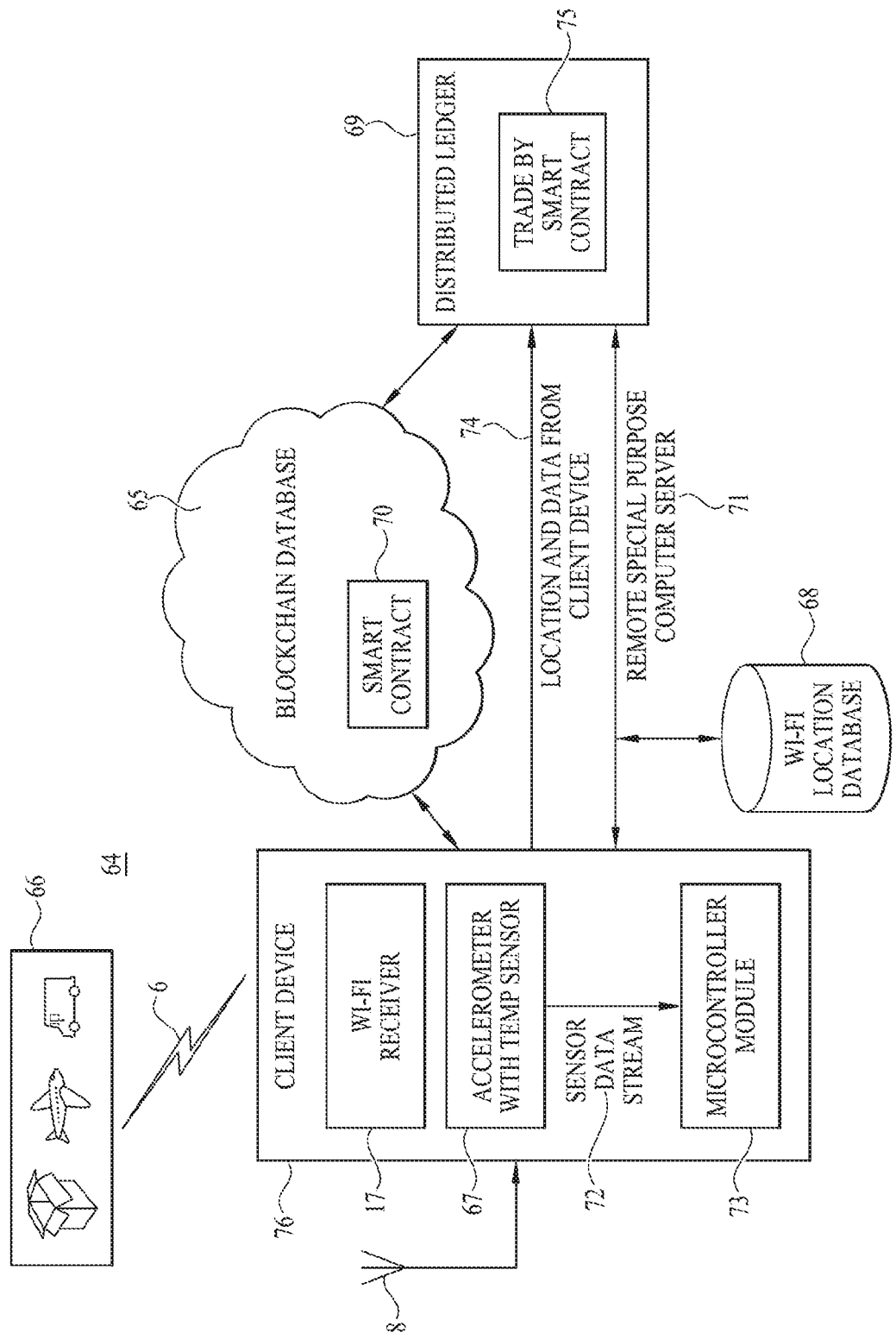
FIG. 7 is an exemplary diagram of a blockchain method for calculating whether a time-critical shipment is located according to an expectation by remote special purpose computer server comparing and reporting real-time ownership and location journey of package; and/or with temperature and other movement data from accelerometer in device; with the location journey of package shipments shared and managed in an immutable and distributed ledger applying blockchain technology and smart contract interactions.

The flow chart of FIG. 7 is an exemplary diagram of the method steps and process 64 of smart contract implementation. The method shows how the computer server with client device 76 described herein may be implemented, along with the location and temperature reporting involved in blockchain technology and a blockchain database system 65 remote from the client device, with smart contract interactions associated to a single and specific package shipment 66 transported by aircraft or truck.

The method, and blockchain technology described herein may be applied to compare data transmitted and received from the small form factor client device, placed inside or on a time-critical package 76, so its real-time ownership, temperature data reported by thermometer inside the accelerometer 67 acting as a temperature reporting data sensor, and location by access points and their signal strength are received by device Wi-Fi receiver 17 reporting nearby Wi-Fi access point data to microcontroller module 73, and further transmitted by GSM radio method 6, so it can be recorded, shared and managed in a distributed ledger and distributed standard under ledger systems 69 in a remote blockchain database 65.

FIG. 7 provides an example in which the method 64 by computer program product described herein may be implemented, along with the entities (i.e., the shipment parties involved in chain of custody) involved in access to blockchain interactions. The method of FIG. 7 includes, but is not limited to client device 76, blockchain database 65, and a smart contract 70 to better validate and manage the ownership, and expectations associated with shock and other movements reported from accelerometer 67, and/or location journey of a package en route to be transferred, shared and traded according to smart contracts. The information about the shipment nearby Wi-Fi location access points received by Wi-Fi antenna 8 and associated movement and temperature data reported from accelerometer 67 is transmitted with nearby Wi-Fi access point location data received, together with other identifying data received from client device 76, after transmission by GSM radio module 6 for comparison in Wi-Fi access point location database 68 that can also interface with the blockchain database for trade by smart contract 75. The special computer server 71 to perform the method then independently stores the location and data results. Such method of not storing data directly in client device for later retrieval or access assures package shipment parties remote blockchain permission-based access to complete location, ownership and temperature data during and after delivery points in the shipment's journey that is trustworthy by the blockchain technology method as it provides access to an immutable and distributed ledger to better validate trackable ownership, device locations and telemetry data reported that is independently stored with time stamp receipt data from the client device, and sent by GSM data transmissions to a remote special purpose computer database server storage with blockchain technology that can't be hacked.

So as long as the terms of the smart contract 70 are met by client device 76, the smart contract 70 can automatically execute an agreement between client device 11 and distributed ledger 69 and access to the blockchain database 65 data stream will automatically be provided by remote special computer server 71. By storing and executing smart contracts on blockchain database 65 a permission-less model is provided that allows the device 76 to join the blockchain database 65 to record, access and make use of the real-time device telemetry data stream 72 from client device 76 to include Wi-FI receiver data 17 even when there is no relationship between client device 76 and distributed ledger 69 and each device may be unknown and un-trusted to the other.

In FIG. 7, the term "blockchain" is utilized in relation to the data reported from client device that is transmitted to, received by and stored in special purpose computer server 71, blockchain database storage module 65, and smart contract 70; where a blockchain is, in general, a distributed database that maintains a continuously-growing list of the reported client device data records hardened against tampering and revision and includes data structure "blocks" and optionally programs or executables. Each block may contain a timestamp and information linking the block to a previous block where a blockchain consists of blocks that hold time stamped batches of valid data. Typically, each block may include the hash of the prior block that links the blocks together, where a "hash" is a hash function in order to add more security by a cryptographic hash function that may be utilized to assist in verifying the authenticity of the entry in the block. This novel method solves a problem in conventional industry practice, by adding something the logistics industry had not been able to obtain by prior methods, by utilizing blockchain access to package shipment trackable ownership location and related telemetry data by client device interaction methods that may as an optional example in the illustrated embodiment, be computed and compared in the device microcontroller module 73 so reported data can be sent by GSM radio module to a second remote computer server with blockchain technology to be then shared and traded in a smart contract 75 with trusted accuracy, and in immutable form.

Using Wi-Fi signals is faster, more precise and battery-friendly than GPS and cell-towers alone. These databases can also be manually updated to add specific new or private Wi-Fi addresses and can include an aircraft's specific Wi-Fi router or hotspot data to reveal its location, using that Wi-Fi positioning to verify a Point of Interest area such as a specific airport, airport terminal floor or zone, specific aircraft's Wi-Fi or hotspot connection, warehouse or holding area floor, room or even Wi-Fi points adjacent to flight runway area or aircraft shipment loading area(s).

When using the system indoors, an optional database library allows for both manual entry and machine learning by matching to historical Wi-Fi location access points (BSSID/MAC address) linked to a latitude or longitude, room, floor or other very specific location (i.e., United aircraft 33 at JFK Airport, terminal 3) and stored in the system's database. The library provides accurate airport, aircraft, and warehouse-level positioning indoors by accessing its database of Wi-Fi fingerprints and reported data points collected over time or manually entered. The additional fingerprints can be collected from both public and private Wi-Fi hotspot databases that are reported and stored in a database with time stamps for each Wi-Fi hotspot noted and by correlating mobile device location data with Wi-Fi hotspot MAC addresses and other recorded data.

The system estimates the mobile device's current geographic location, latitude and longitude, by using as references one more Wi-Fi signals for location reporting of the package from the attached client device, within range. This can also be complemented or augmented by using Cell-ID location data that the attached mobile device receives, in addition to Wi-Fi. The location is reported by using cellular tower networks (GSM, CDMA, 3G, LTE, 5G, LTE-M1, NB-IoT) and across all operators throughout the world. It should be noted that the Wi-Fi system and method only listens for signals and does not attempt to connect or transmit to any wireless Wi-Fi networks. A combination of these techniques may be used to increase the accuracy of the system.

The web services API enables applications to submit via HTTP, SMS or USSD message formats that can include a Wi-Fi access point identifier and signal strength to obtain its geographic location, latitude and longitude, and indoor location data plus an optional confidence radius. The same data can also be reported for a cell id or cell tower identifier data to augment location confidence and reporting.

The GSM location message transmissions by the package-positioning device can also be enabled to add high-grade proven cryptography targeted at small form factor devices and building around that additional security application services such as device identity management. Such cryptography can be added into smart baggage tags and connecting package devices to airline and airport enterprise applications via a secure M2M/IoT cloud application addressing IATA 753 airline industry standard but it also addresses, for example, airport concerns about the security of smart baggage tags and other trackers and the potential creation of millions of insecure mobile hackable endpoints.

Incorporating blockchain in combination with the IoT enabled sensor device attached onto or placed inside packages can add real-time ownership and location journey of package shipments to be shared and managed in a distributed ledger enabling AirTrace Service to be part of a distributed standard.

The blockchain technology can be incorporated to add and share data from the device attached to any object entrusted to someone else for transport, with trackable ownership, possession, locations and telemetry parameters such as, accelerometer data around motion, shock and temperature. The final buyer or package delivery recipient can access a complete record of information and trust that the information is accurate and complete since the blockchain adds an immutable and distributed ledger that can't be hacked. Blockchain permits additional streams of real-time data to enhance analytics and patterns accessible to parties with AirTrace Services that can receive, record and share data from device with GSM sensor data reporting including location and other embedded sensor data such as from the accelerometer with built-in internal thermometer so multiple data telemetry can be shared with trusted accurately and with completeness. Such system can enable chain of custody of a shipment independently to better validate and manage the ownership and journey of a package to be transferred and traded according to smart contracts.

A special feature of the invention is the way it determines whether a device location at various times matches the expected locations at those times. Another special feature is the way the device uses vibration of aircraft or truck engines or movement to turn off the device's GSM module, thereby saving power during the times when the a GSM transmission would be useless and in the case of aircraft, to comply with aviation regulations.

Overall the device and system includes computer assisted server, device vibration and movement data listening, processing and location determination methods to temporary prevent in-flight radio transmission with transmission deactivation methods designed to be compliant with regulations and restrictions that have been in effect since 2003 when the United States Federal Aviation Administration (FAA) required restrictions on use of mobile communication aboard all aircraft during flight for aviation safety and avoidance of interference with aircraft avionics. This represents an automated computer implemented approach to what airlines require passengers to manually activate their mobile device "airplane mode" before or during flight, as flight safety requirements and regulations require text telephony and other signal-transmitting technologies such as GSM or other wireless radio communications to remain off in-flight. In the case of truck shipment the device and system rely on the accelerometer to listen for movement of a package with the client device and turn on or off transmissions accordingly, to maximize power conservation and report by GSM radio module only when programmed or instructed to do according to accelerometer movement parameters.

As defined, a Package is a bundle of something, that is packed and wrapped or boxed. It can represent a stand-alone parcel or a container, such as a box or case, in which something is or may be packed for goods, freight, or logistics transport. It can also be a finished product contained in a unit that is suitable for immediate installation and operation, as an aircraft or other critical replacement part, and can also include items for medical and pharmaceutical transport.

The term USSD (Unstructured Supplementary Service Data) is a Global System for Mobile (GSM) communication technology that is used to send text between a mobile phone and an application program in the network. Applications may include prepaid roaming or location reporting. USSD is similar to Short Messaging Service (SMS). Unlike SMS, USSD transactions occur during the session only. With SMS, message scan be sent to a mobile phone and stored for several days if the phone is not activated or within range. The Wireless Application Protocol (WAP) supports USSD. USSD is defined in the GSM standard documents GSM 02.90 and GSM 03.90.

The term Wi-Fi refers to a wireless networking technology that allows computers and other devices to communicate over a wireless signal. It describes network components that are based on one of the 802.11 standards developed by the IEEE and adopted by the Wi-Fi Alliance. Examples of Wi-Fi standards, in chronological order, include: 80211.a, 80211b, 80211g, 80211n, and 80211ac.

Wi-Fi is the standard way computers connect to wireless networks. Most wireless communication devices have Wi-Fi chips to allow Device to find and discover wireless routers. Most mobile devices support Wi-Fi, enabling them to connect to wireless networks as well. When a device establishes a Wi-Fi connection with a router, it can communicate with the router and other devices on the network. A Wi-Fi "hotspot" includes the geographic boundary covered by a Wi-Fi (802.11) wireless access point. Typically set up for Internet access, a device entering the hotspot with a Wi-Fi-based receiver inside can view the access point in range and configured to advertise their presence (beaconing) and authorization is not necessary.

The term GSM, also known as: "Global System for Mobile Communications, is a generally a TDMA based wireless network technology. GSM phones make use of a SIM card to identify the user's account. The use of the SIM card allows GSM network users to move their phone identity from one GSM device to another by simply moving the SIM card. Currently most GSM networks operate on the 850 MHz, 900 MHz, 1800 MHz, and 1900 MHz frequency bands.

The term SIM stands for subscriber identity module or subscriber identification module (SIM) is an integrated circuit that is intended to securely store the international mobile subscriber identity (IMSI) number and its related key, which are used to identify and authenticate subscribers on mobile telephony devices (such as mobile phones and GSM devices). The SIM circuit is part of the function of a Universal Integrated Circuit Card (UICC). "SIM cards" can be separate cards or virtual circuit cards and are transferable physically or electronically (e.g., by Internet database) between different mobile devices. A SIM card contains its unique serial number (ICCID), international mobile subscriber identity (IMSI) number, security authentication and ciphering information.

The term USSD Gateway is a session-based protocol. USSD messages travel over GSM signaling channels and are used to query information and trigger services. USSD establishes a real time session between mobile device and application handling the service.

The term SS7 signaling is the core signaling/control protocol used within fixed and mobile networks. The SS7 network is an interconnected set of network elements that is used to exchange messages in support of telecommunications functions.

In view of the foregoing structural and functional description, those skilled in the art will appreciate that portions of the systems and method disclosed herein may be embodied as a method, data processing system, or computer program device such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention, therefore, is well adapted to carry out the objectives and attain the ends and advantages mentioned, as well as others inherent therein. While the invention has been depicted and described and is defined by reference to particular embodiments of the invention, such references do not imply a limitation on the invention, and no such limitation is to be inferred. Consequently, the invention is intended to be limited only by the spirit and scope of the appended claims, giving full cognizance to equivalents in all respects.

The invention claimed is:

1. A system as part of determining the location of a shipment relative to its expected location comprising:
  a positioning device adapted for being attached to, adhered to or placed within package(s); and
  a remote computer, wherein the remote computer system is configured for use in connection with a package in-process of being delivered, or being prepared for, staged for, or in-transit of delivery;
  the positioning device comprising:
    a wireless radio module adapted to electronically pair and exchange data between a non-RFID short-range communications module inside of the positioning device and remote communication device(s) for multipoint wireless data sharing between a mobile phone, scanner, and/or other nearby communications module-enabled device(s) in range of the positioning device; and
    wherein the remote communications device(s) communicate(s) the transmitted package 1D and paired associated identification and data transmission(s) received from the positioning device and/or other reported data to the remote computer; and the remote computer comprising:
  a transit plan schedule database derived from package or other shipment identification data including: the paired and associated positioning device, delivery destination and/or a time-crucial delivery expectation(s); local databases and/or linkages to remote databases that provide various sources of location or positioning device reported information; and
  a processor programmed to determine and report location(s) and/or location(s) and time of the positioning device(s) when entering/exiting a defined Point of Interest and/or geographical area or boundary;
  wherein the remote computer(s) compares the determined location of the positioning device to an expected location and/or delivery expectation(s) based on common carrier shipment transit plan schedule(s) and/or in-transit package shipment location(s) received from the device and/or location database sources, and
  communicate in real-time or near real-time to users that include: a common carrier and/or other shipping parties in the chain of custody of a package in-transit, or by data storage into one or more database system(s): the reported Point of Interest entering/exiting area geographical boundary informational alerts, notifications or system determined exception(s) to on-schedule delivery expectations(s), and for the remote computer to notify when there is a problem or exception with shipment; and
  connect the positioning device reported data to enterprise application(s) for the enterprise application(s) and/or computer system(s) to determine and communicate by machine notification interface when package is not proceeding according to expectation schedule and/or has related shipment exception(s).

2. The system of claim 1 wherein device is adapted for being attached to, adhered to or placed within package by the shipper or designated third party.

3. The system of claim 1 comprising issuing a notification from the remote computer system to users if a package is determined to be at a location other than the expected scheduled location.

4. The system of claim 1 whereby the location database(s) connects by at least one of an: API, web services, mobile device app, and/or cloud based systems to a mapping location database and/or common carrier reporting or tracking service.

5. The system of claim 1 wherein the package positioning device further comprises an accelerometer module that uses associated device microcontroller processing firmware and software to measure data patterns around package movement detection(s); and when detected, communicates to microcontroller and/or device's processor to force the positioning device to power up and transmit the movement associated data detection to communications-enabled device(s), when in proximity range of the positioning device, and/or for the module(s) in proximity to in turn communicate the movement data to the remote computer.

6. The system of claim 1 wherein the device further includes a barcode that identifies shipment or package identification data and can be read by an optical scanner or reader and decoded by a computer system to open an app from mobile phone, remote communication device(s), and/or connect positioning device to report pickup or shipment delivery information.

7. The system of claim 1 wherein the device further comprises a temperature reporting data sensor to measure and communicate a change in temperature data en route, and/or at point of staging and/or delivery, from one or more positioning device(s) attached to, adhered to or placed within packages, between a mobile phone and/or other communications-enabled devices to database(s) of the remote computer(s).

8. The system of claim 1 whereby positioning device connects to a computer system by a cloud account and/or mobile device app when in proximity to a communications-enabled mobile device(s) or computer system(s) to first register the positioning device by a unique serial number or other form of identifier to pair and share data, and/or by a barcode associated with a device or package ID number, or by received transmitted identification data from positioning device with high-grade cryptography, and then to receive notifications and/or determined location data by the remote computer(s).

9. The system of claim 1 whereby a short-range communications module provides access to the device communication functionality that pair between two or more devices for multipoint wireless data sharing that enable the positioning device to broadcast its presence in range of a second communications module-enabled device that includes the mobile computing device(s) of shipment common carrier courier driver and/or another nearby mobile device(s) with communications module; to transmit data to be sent to the remote computer via communications between a wireless communication network and a mobile communication device, and/or communications module-enabled gateway device with a Wi-Fi and/or other non-RFID mobile network communication device.

10. The mobile device of claim 1 wherein the determined location(s) reported from the remote mobile device(s) in range of positioning device is determined based on the location of a mobile phone, Wi-Fi network, a mobile carrier(s)' network elements, short-range communications networks, or a combination thereof.

11. The system of claim 1 whereby the short-range communications module shares its unique device ID and pairs location and the shipment tracking, priority flow paths, sortation and/or contingency actions of package through an API interface to the remote computer system and/or to mobile phone(s) or mobile computing device(s) of a shipment delivery by common carrier for a package in-transit.

12. The system of claim 1 comprising issuing a notification to the computer system if a shipment is determined to be moving in or out of a Point of Interest geographical area or boundary, for a specific airport, terminal floor, warehouse, truck, loading, or other zone.

13. The system of claim 1 whereby the device further comprising a chipset within its communications module that interfaces with a microcontroller unit in the device to determine and report real-time location(s) of the positioning device to a mobile phone and/or communication device(s) when inside a Point of Interest geographical area or boundary, for a specific airport, terminal floor, warehouse, truck, loading, or other zone.

14. The system of claim 1 whereby the computer system connects to a web services or API to communicate short message, positioning device identification and location, paired mobile device(s) data, and/or other data including geographic location, latitude and longitude, and/or indoor location data to a secure M2M/IoT cloud application with one or more communications module(s) for the communicating of package shipment positioning device reported data to enterprise system application(s).

15. The system of claim 1 whereas a device may be a phone, tablet, short-range communications module-enabled device reader, or remote communications device capable of receiving communication signals and data, and with the ability to communicate with other devices, mobile apps and computers via the internet and/or other communications networks.

16. The system of claim 1 whereby the remote computer receives and exchanges data reported from positioning device and communicates the determined location(s) and other data that may further include any reported temperature or movement reported data into a blockchain database and/or blockchain system with ownership and location journey of package shipments shared and managed in an immutable and distributed ledger so shipment reported data can be transferred or traded according to smart contracts in a blockchain.

17. A system as part of determining and reporting a location by computer-implemented system when a package is not proceeding according to a shipment expectation(s), comprising:
   a short-range communications-enabled package monitoring device adapted for being attached to, adhered to or placed within packages; and
   a remote computer;
   the device comprising:
   a short data messaging wireless short-range communications module inside the package monitoring device comprising a non-RFID communications module that electronically pairs and associates a shipment with the attached monitoring device, and a remote database(s) that store/provide to a remote computer system, an indication by shipper, recipient, representative or designated third party that a package with device is not proceeding according to expectation schedule and/or related shipment issue(s); and wherein the shipper, recipient, representative or designated third party sets a flag in the system and/or in a mobile app indicating that the monitoring device attached to package is not proceeding according to shipment exception(s) and/or has related shipment issue(s); and wherein the package monitoring device is configured for receiving a location in the proximity of the package monitoring device by the system, as determined from one of a plurality of remote mobile communication devices associated with nearby wireless connected remote mobile phone(s) or mobile communication device(s) connecting to wireless transmission network(s) and communicating to system the data received from package monitoring device(s) connected to wireless transmission network(s) by the remote mobile device(s), and wherein the system is configured for further communicating with a crowd sourced network of radio module connected remote mobile phone(s) or other mobile device(s) when in the communication proximity of package monitoring device, and, providing the determined location reported from the crowd sourced network of mobile phone(s), and/or other communications-enabled mobile device(s) in proximity to the package monitoring device(s) to help track the location reported based on the location positioning reported to the remote computer system by the mobile device(s) in the proximity of the package monitoring device(s);

wherein the remote computer system determines and/or communicates the location of package monitoring device(s) back to the shipper, recipient, representative or a designated third party, or the shipment parties involved in its chain of custody, by SMS and/or an alert notification message sent to a third party server, and/or mobile phone, or other communications device or monitoring system by machine notification interface.

18. The system of claim 17 whereby shipper, recipient, representative or a designated third party, or the shipment parties involved in its chain of custody will receive a notification message after package with exception reporting flag has been located in the short-range communication proximity of package monitoring device(s) with the determined location or a last known location.

19. The system of claim 17 whereby device connects to a computer system by a cloud account and/or mobile app when in proximity to a mobile device or computer network to first register and associate the short-range communications module of package monitoring device to package(s) and then receive notifications when flag(s) indicate(s) the package is lost, stolen or misplaced with location shared with authorized user(s).

20. The system of claim 17 whereby the shipper, recipient, representative or a designated third party, or the shipment parties involved in its chain of custody can store their contact information in the system via the remote computer, which can be read by using communications module in a mobile device when the device is put into a lost, misplaced or stolen mode by the system to associate a shipper, recipient, representative or designated third party of shipments so shipment parties involved in its chain of custody will receive a notification message(s) and/or location data when it is located.

21. The system of claim 17 whereby a short-range communications module application framework provides access to the device communications module functionality that pair between two devices for point-to-point and multipoint wireless data sharing that enable the device to broadcast its presence in range of a second communications module device that includes the mobile computing device(s) of shipment common carrier courier driver and/or another nearby mobile device(s) with communications module; to transmit data to be sent to the remote computer when the transmission module is one of a short-range communications module network and a mobile communication device, and/or wireless gateway device with a Wi-Fi access and/or mobile network communication access device.

22. The system of claim 17 whereby package monitoring device connects to the location database(s) by API, mobile app, mobile phone, and/or cloud based systems to register, manage, and/or connect monitoring device(s) to include: setting a flag for system to then determine and report device location(s) to the remote computer(s) by nearby mobile phone(s), communication device(s), mobile apps or computers via the internet and/or other communication networks.

23. The system of claim 17 comprising issuing a notification to the computer system if a shipment is calculated to be moving in or out of a Point of Interest geographical area or boundary, for a specific airport, terminal floor, warehouse, truck, loading, or other zone.

24. The system of claim 17 comprising adjusting the frequency and interval timing of communications module transmission reporting by the package monitoring device to save power if a shipment is calculated to be moving in or out of a Point of Interest geographical area or boundary, for a specific airport, terminal floor, warehouse, truck, loading, or other zone.

25. The system of claim 17 whereby the short-range communications module shares its unique device ID and pairs location and digital activity of the package through an API interface to the remote computer system and/or to mobile phone(s) or mobile computing device(s) or mobile app of a shipment delivery by common carrier for a package staged for shipment, in transit, and/or being delivered.

26. The mobile device of claim 17 wherein the determined location(s) reported from the remote mobile device(s) is determined based on the location of a Wi-Fi network, mobile phone reported location(s) determined by mobile phone device(s) connected to a mobile network, a mobile carrier network elements, or a combination thereof.

27. The system according to claim 17, wherein mobile device(s) detects a unique identifier of one or more short-range device communications module(s) inside package monitoring device when in proximity range of the package monitoring device to report real-time location(s) by a mobile app and/or web services application that is activated when package monitoring device is in communications range of mobile device(s) to determine and report location data.

28. The system of claim 17 whereby the short-range communications module further reports and adds real-time, accurate location granularity for both indoor or outdoor location determination by a mobile phone app, accessed by a mobile phone or other communications-enabled device when in short range proximity to package monitoring device communications module, and communicates the real-time location data to a mapping location database associated with a mobile app and/or the remote computer system database(s).

29. A computer system that connects to a web services or API to submit short message data that include short-range communications-enabled module(s) adapted to obtain geographic location, latitude and longitude, and/or indoor location data by a secure M2M/IoT cloud application, by a non-RFID short-range device communications module in range of remote communications module device(s), for the connecting or pairing a package positioning device(s)' data with a communications module(s) adapted for being attached to, adhered to, or placed within package(s), and
 a remote computer to communicate the shipment reported data received from the short-range communications-enabled module(s) associated with package positioning device(s) to enterprise application(s) or mobile apps for tracking device position for location monitoring applications with both indoor and outdoor mapping location database(s) and/or enterprise system(s) to communicate and report positioning device data;
 whereas the remote communications module device(s) connects by at least one of a: phone, tablet, short-range communications-enabled module communication device reader, or other device capable of receiving package positioning device(s) communication signals and data, and with the ability to communicate with other devices, mobile apps and computers via the internet and/or other communications networks.

30. A system for determining and reporting a location by computer-implemented system when a package is not proceeding according to a shipment expectation(s), comprising:
 a non-RFID short-range communications module that provides access to the wireless communications functionality of a package positioning device comprising a non-RFID short-range communications module inside the device adapted for being attached to, adhered to or placed within package(s); and
 a remote computer, wherein the remote computer system is configured for use in connection with monitoring location(s) of a package in-process of being delivered, or being prepared for, staged for, or in-transit of delivery;
 whereby the system pairs package positioning device data between two devices for multipoint wireless data sharing that enable the package positioning device to broadcast its presence by short-range communications transmission methods when in range of a communications-enabled device that includes the mobile computing device(s) of shipment common carrier courier driver and/or another nearby mobile device(s) with communications module; to transmit location data to be sent to the remote computer when the remote communications module transmission module is one of a wireless communication network, a mobile communication device, and/or a radio module gateway device with a Wi-Fi and/or mobile network communications-enabled device that connects to the remote computer; and
 wherein a processor programmed in the remote computer system, with access to database(s) sources, determines a real-time or near real-time package positioning device location(s) and/or location(s) and time, and then compares the determined location(s) to report when package(s) is not proceeding according to expectation schedule and/or has related shipment exception(s); and
 issues a notification from the remote computer system(s) by SMS and/or an alert notification message and sent to a third party server, and/or mobile phone device, or other communication device(s) and/or system by machine notification interface if a package is determined to be at a location other than the expected scheduled location(s) and/or has related shipment exception(s).

* * * * *